June 28, 1949.    R. G. McPHAIL    2,474,317
LIGHT REFRACTING AND TRANSMITTING PLATE
AND LIGHTING EQUIPMENT USING THE SAME
Filed April 23, 1946    5 Sheets-Sheet 3

INVENTOR
ROBERT G. McPHAIL
BY
ATTORNEY

June 28, 1949.  R. G. McPHAIL  2,474,317
LIGHT REFRACTING AND TRANSMITTING PLATE
AND LIGHTING EQUIPMENT USING THE SAME
Filed April 23, 1946  5 Sheets-Sheet 4

INVENTOR
ROBERT G. McPHAIL
BY
ATTORNEY

June 28, 1949.  R. G. McPHAIL  2,474,317
LIGHT REFRACTING AND TRANSMITTING PLATE
AND LIGHTING EQUIPMENT USING THE SAME
Filed April 23, 1946  5 Sheets-Sheet 5

INVENTOR
ROBERT G. McPHAIL
BY
his ATTORNEY

Patented June 28, 1949

2,474,317

UNITED STATES PATENT OFFICE 2,474,317

LIGHT REFRACTING AND TRANSMITTING PLATE AND LIGHTING EQUIPMENT USING THE SAME

Robert G. McPhail, Newark, Ohio, assignor to Holophane Company, Inc., New York, N. Y., a corporation of Delaware Application April 23, 1946, Serial No. 664,164

20 Claims. (Cl. 240—106)

The present invention relates to light refracting and transmitting plates and lighting equipment using the same and is more particularly directed toward plates and fixtures characterized in that prism-like elements which I call "cut-off" prisms are utilized to prevent the light from going in unwanted directions.

The invention is particularly applicable for use in closures in lighting apparatus where the bare or incompletely screened source is reasonably distant from the observer and at so low an elevation above the eye of the observer as to be emitting light rays at such high angles below the horizontal as to be within the peripheral field of vision. Such conditions are very generally present where structural conditions require long lines of fluorescent lighting equipment to be installed at limited mounting height, for then the equipment is viewed lengthwise and more and more of it comes into the glare zone as it recedes from view. The total glare effect of viewing a line of fluorescent lamps lengthwise of the lamps and at angles near the line of sight becomes very great.

Where natural light is concerned conditions frequently arise where excessive brightnesses occur near and laterally of the normal line of vision, as, for example, the inner surface of a glass brick wall viewed obliquely may be intolerably bright, and excessive brightness may similarly be obtained by reason of light coming in through a window opening.

According to the present invention the light transmitting and refracting plate is made of homogeneous transparent material so that there is nothing inside the plate to interfere with internal light transmission in any direction. The plate is provided with a prismatic contour which cuts off emitted light in certain directions in which it would be otherwise emitted.

As the design of long lighting equipment must consider the fact that the equipment may be looked at from either end, it is necessary that the cut-off operation be alike in either longitudinal direction, and this requires that the prismatic contour and light ray paths be symmetrical lengthwise of the equipment. It preferably consists of a series of alternately sloped surfaces on the emergent surface of the plate. Such surfaces can receive once refracted light at angles within the critical angle to the normal of the incident surface. They have a natural or total cut-off angle identical with the angle the surfaces make with the horizontal and another or principal cut-off angle for such once refracted light approaching them, dependent upon the tilting of the surface to the horizontal and the index of refraction of the medium. Such tilted surfaces, however, cannot transmit all the once refracted light which falls on them and must reflect some of it either toward an adjacent oppositely sloped surface or toward the first or incident surface. After the first reflection or a subsequent reflection, these rays are possible sources of light to be received by the adjacent or a remote oppositely facing tilted surface at such angles as to be refractively transmitted at angles above the principal optical cut-off which the second refraction provided, and it is an object of the present invention to provide cut-off prisms which effectively prevent such unwanted transmission.

The accompanying drawings illustrate certain optical principles involved, also three prismatic configurations which may be employed for the purpose and a lighting fixture utilizing the optical features of the invention, these drawings being illustrative of the invention.

Figure 1:
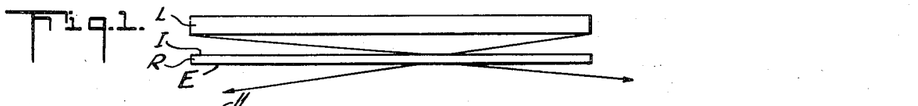
Figures 1 and 2 diagrammatically illustrate the action in a plane normal to the surfaces of a refracting plate having parallel surfaces.
Figure 2:
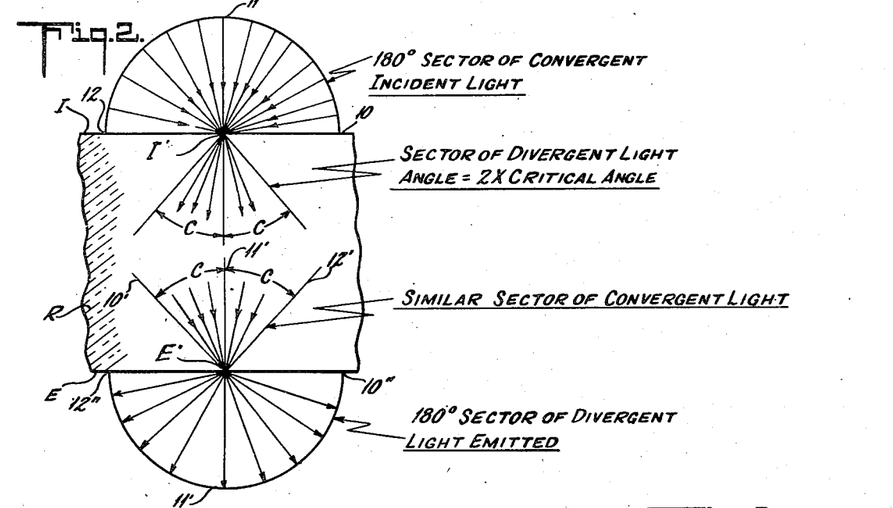

In Figures 1 and 2 the incident surface I of the plate R and the emergent surface E are, for convenience deemed to be in horizontal planes and the surface I above the surface E. Any point I on the upper surface will receive light in the plane of the paper from a semi-circular sector which is illustrated by the vertical semi-circle 10—11—12. Except for surface reflections, these rays will enter the refractor, typically glass, and will be deviated to be within the critical angle of the normal N to the surface I. They will be within a sector with its apex angle at 0 twice the critical angle C. Thus all the light in the refractor will be within such a sector and hence at any point on the lower or emergent surface it will impinge on this surface at angles of incidence not greater than the critical angle. This is illustrated by the lower sector 10′, 11′, 12′, with apex at E′. This light will, except for internal reflections and losses, be transmitted throughout a semi-circular sector 10″, 11″, 12″.

The light in the vertical plane may be assumed to come from a long horizontal light source such as a line of fluorescent lamps L close to the surface I. As light may strike the upper surface at angles of incidence of substantially 90° it is transmitted at similar grazing or horizontal angles, and this accounts for the bright glint line commonly experienced where the fluorescent lamp is above a plain transparent cover.

Figure 3:
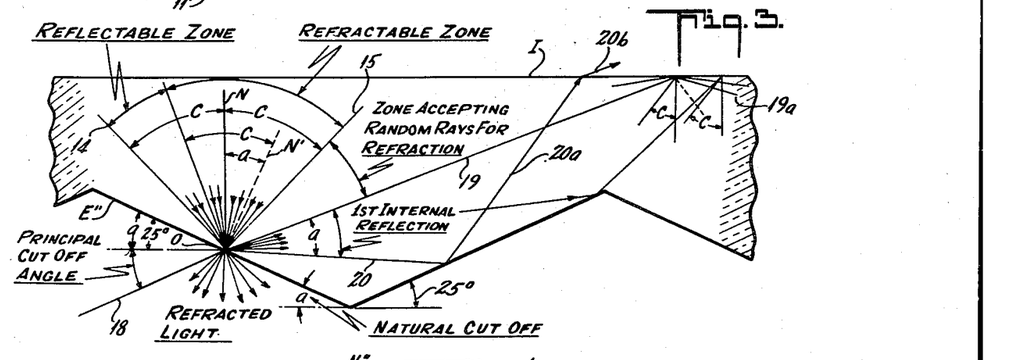
Figures 3 and 4 are diagrammatic illustrations to show the action which takes place when the emergent surface is out of parallelism with the incident surface.
Figure 4:
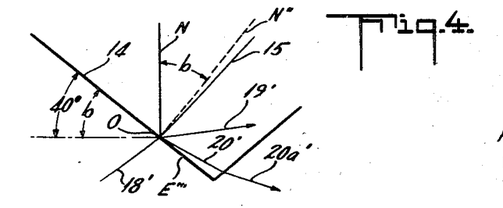

While the conditions illustrated in Figures 1 and 2 obtain when the emergent surface is parallel to the first or incident surface, it does not when these surfaces are out of parallelism in longitudinal planes. The different result is illustrated in Figures 3 and 4. In Figure 3 the normal N′ to the new emergent surface is swung clockwise through an angle of $a$ (25° in the figure) with the normal N to the first surface. In Figure 4 the angle $b$ between the new normal N″ and the first normal N is 40°. The tilted surfaces E″ and E‴, have respective natural angles of cut-off of $a$ (25°) or $b$ (40°) and transmit light throughout the angle between the surface and the line 0—18 or 0—18′, these rays corresponding with the extreme ray 0—15. In this manner a principal optical cut-off is provided, for no light within the sector 14—0—15 will be transmitted above ray 0—18 Figure 3, or 0—18′ Figure 4.

Some light in the left portion of the sectors 14—0—N at angles greater than C to N′ or N″ will be internally reflected as illustrated at 19—0—20 or 19′—0—20′. The portion of this light which reaches the upper surface of the plate may be all or in part within the critical angle. That within the critical angle is transmitted upwardly and may be disregarded. (See rays 20a—20b in Figure 3.) That which is reflected by the upper surface will reach some remote tilted surface in the bottom of the plate as indicated by rays 19—19a. The portion of the light in sector 19—0—20 or 19′—0—20′ which reaches the adjacent oppositely sloped surface, may depending upon the angle selected, be (1) refractively transmitted as on 20a′, Figure 4; or (2) reflected upwardly to the upper surface within the critical angle for transmission; or (3) reflected at angles where it is again reflected toward a remote tilted surface. Should any of the light reflected downwardly by the first or incident surface I reach any of the tilted surfaces at angles below 0—15 and within the critical angle C to the normal to that surface, transmission of random rays into the air above rays 0—18 or 0—18′ would result.

From the above it will be seen that transverse ribs with too high a slope have secondary transmission which allows light to escape above the principal cut-off angle.

As the plate is viewed in either direction and stray reflections in asymmetric constructions will eventually cause stray emissions from the plate, it is necessary to restrict the solution of the problem to symmetrical constructions. Then if any two adjacent inclined surfaces be considered and symmetry maintained, it is obvious from the principles of reversibility of light paths that the bundle of rays approaching a point on one tilted surface must be in the same position as would be the reflection from that point of rays received by it by reflection from a point on the other tilted surface.

Figure 5:
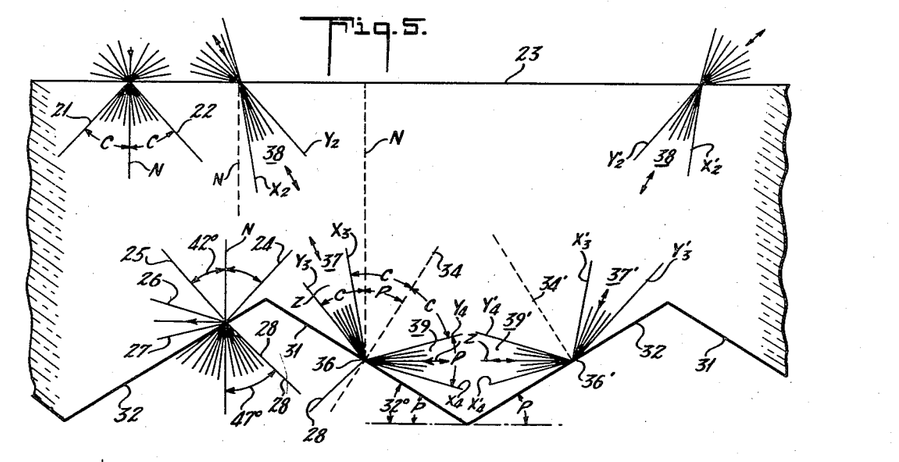
Figures 5, 6 and 7 are diagrammatic views illustrating the action which takes place in one form of true cut-off prism.
Figure 6:
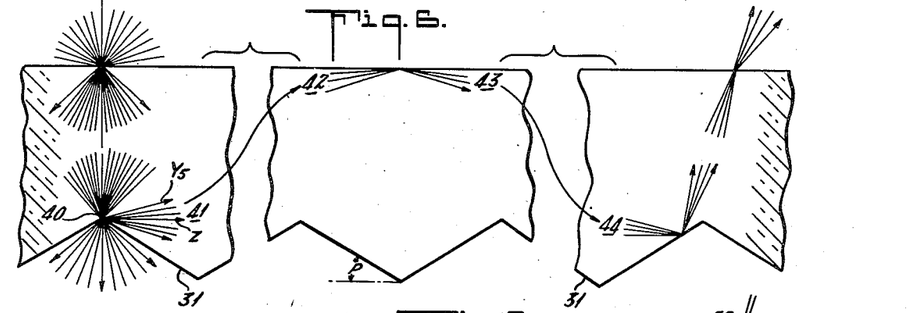
Figures 10, 11:
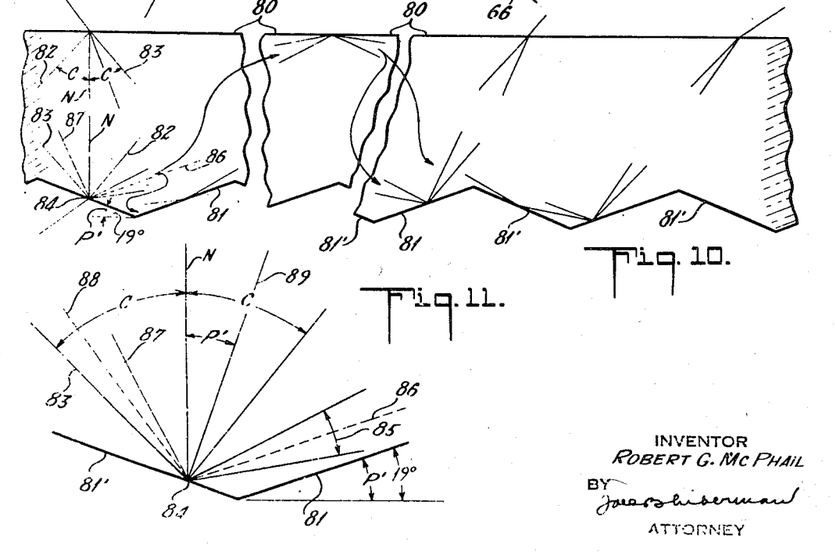
Figures 10 and 11 are diagrammatic views illustrating the action which takes place in a second form of true cut-off prism.

This symmetry can occur under several conditions, namely, when the bisectors of the odd numbered reflections on the ribbed surface are horizontal as indicated in Figures 5 and 6, or when the bisectors of the odd numbered reflections on such ribbed surfaces are parallel with the reflecting surface of the adjacent rib, as indicated in Figures 10 and 11, or when after multiple reflections the bisectors of the odd numbered reflections are either horizontal or are parallel with the reflecting surface of the adjacent rib.

The left of Figure 5 again shows limiting rays 21 and 22 at the angle C to the normal N to the incident surface 23, the impingement of the corresponding rays 24 and 25 on the lower surface, the internal reflection of rays into a zone bounded by rays 26 and 27 and the transmitted rays between the ray 28 and the leftwardly inclined lower surface 32. At the right the bundles of rays in the reflectable zones only are shown. The emergent surfaces at 31 and 32 are at the angle P with the horizontal and are such that the bisector Z of the reflected beam is horizontal. The normal to the incident surface is again shown at N and normals to the surfaces 31 and 32 at 34 and 34′, respectively. Light falling on point 36 on surface 31, at angles of incidence greater than C will be reflected. This extreme ray is shown at $X_3$. The greatest angle of incidence is that of ray $Y_3$ (parallel with ray 22) and an angle of C with normal N. This sector of reflectable light is indicated at 37 and the corresponding sector 38 of light refracted from the first surface is between $X_2$ and $Y_2$ parallel with $X_3$ and $Y_3$ respectively. The reflected sector 39 corresponding with 37 is between lines $Y_4$ and $X_4$ and is of the same angular width as 38 and 37. Its bisector is at Z. The same conditions prevail for the right inclined surface 31 and the rays are similarly shown and indicated by the same reference characters with a prime (′) added and all light which enters in sector 38 will go out from sector 38′.

The value of the angle P may be obtained as follows:

Angle $N$-36-34$=P$ by definition
Angle 34-36-$X_3=C$
Angle $N$-36-$Y_3=C$
Angle $X_3$-36-$Y_3=N$-36-34
Angle $X_3$-36-$Y_3=P$ The angular width of the sectors 37, 38 and 39 is therefore equal to the prism angle P.

The bisector Z of sectors 39—39′ is here separated from rays $X_4$-$Y_4$ by ½P. As bisector Z is 90° from N $$C+P+\tfrac{1}{2}P=90°$$
$$\tfrac{3}{2}P=90°-C$$
$$P=60-\tfrac{2}{3}C$$

With glass or other refracting medium of an index of refraction of 1.5, the angle C (to the nearest °) is 42°.

$$P=60°-\tfrac{2}{3}(42°)$$
$$=60°-28°$$
$$=32°$$

While in practice this angle may conveniently be measured from the horizontal, yet when third dimension analysis is carried out, it is preferable to refer it to the trace of the longitudinally extending plane at the incident surface.

The limiting refractable rays 24 and 25 are 42° from N or 10° from 34 or 34'. An angle of incidence (in such glass) of 10° corresponds with an angle of refraction of 15°. The principal cut-off angle of ray 28 is therefore 15°+32° or 47° above nadir.

Figure 5 has considered light which falls on an inclined surface at a sufficiently low point to be completely intercepted by the adjacent surface. Figure 6 illustrates what happens to light from a higher point such as 40 and on the first reflection goes out at high enough angles to escape directly to the first surface 31. This sector 41 of light is between the horizontal line Z which is the same as the bisector Z and an upwardly sloping line $Y_5$ parallel to and corresponding with $Y_4$. Sector 42 corresponds with section 41, and is reflected as indicated at 43 onto some remote prism surface as indicated at 44 and as this sector is like the upper half of sector 39, it is disposed of by another reflection and refraction.

The over all result of such a construction is that a series of such ridges will have a partial cut-off angle of 47° and a complete cut-off at 58° (90°−32°). This effect takes place not only for rays in a longitudinal plane normal to the incident surface, but to a considerable extent when the incident surface is tilted, as when controlling lateral distribution.

Figure 7:
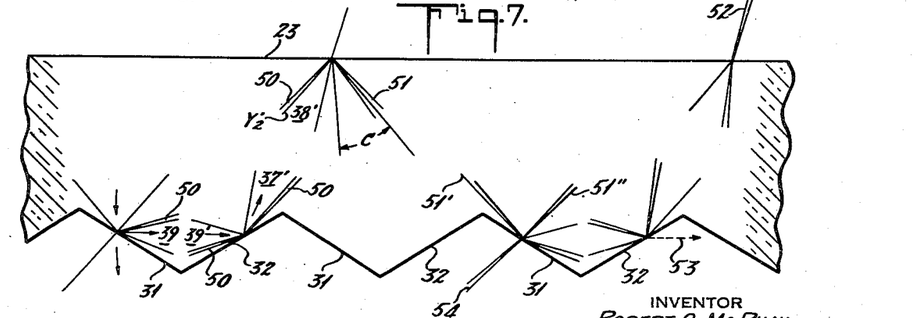

Owing to the fact that considerable light is reflected from a surface when the angle of incidence is near the critical angle, there will be (as indicated in Figure 7) a narrow sector 50, above sector 39, or below sector 39'. This is reflected lower than 37' and strikes the upper surface 23 above $Y_2'$ and is reflected back into the medium at 51, an angle outside the critical angle. Such light will strike the lower surface as indicated at 51' or 51''. Rays such as 51' will be largely reflected and pass above the plate, as indicated at 52. There is some leakage such as ray 53 which causes emission at high angles nearly parallel with the general direction of the plate. Rays such as 51'' are refractively transmitted in regions 54 just above the principal cut-off so as to increase it.

In Figures 5, 6 and 7 it has been assumed that the source and all rays therefrom are in a plane perpendicular to the upper surface of the plate, a plane which could be represented by the paper on which these diagrams are drawn. In other words, a strightly 2-dimensional distribution of light has been assumed. This, of course, is not in accordance with the fact in any practical installation. A 3-dimensional analysis of the effectiveness of the cut-off prisms has been made. It has been found that as the obliquity of the rays to the plate increases the stray light indicated by the ray 50 in Figure 7 is increased and further that this increase can be reduced by suitable lateral prisms on the inside of the plate.

Figure 8:
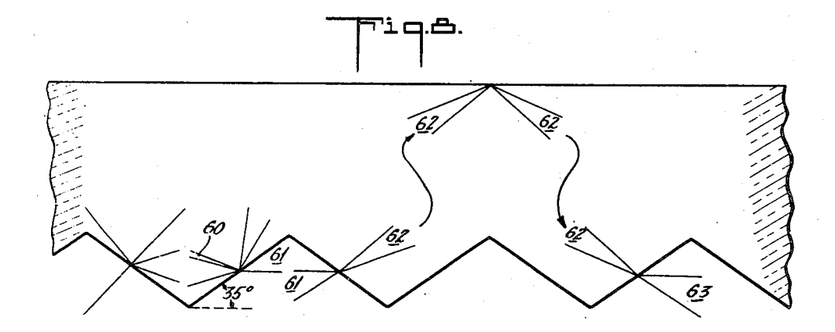
Figures 8 and 9 are diagrammatic views illustrating the action which takes place in cut-off prisms of slightly different angle.

Prisms approximating the best slope for cut-off purposes still give fairly satisfactory results. Such prisms are shown in Figures 8 and 9.

If the slope of a cut-off prism is increased beyond 32°, some of the light as in zone 60 on the first reflection will strike the adjacent surface above the critical angle and will be transmitted in zone 61 directly into the air. If the slope is less than 35°, however, this emission will be above 90° and therefore will be absorbed by the adjacent prism as indicated at 62. It will be noted that after reflection from the upper surface, it is again emitted from some distant prism in zone 63 at angles less than 90° and consequently increases the brightness of the plate at very high angles. Due to the small amount of light involved in the first place and the numerous reflections, this increase in brightness is not very great and therefore any prism between 32° and 35° will be classed as a cut-off prism. Prisms deeper than 35° emit light directly below 90° and consequently become too bright to be useful for this purpose.

Figure 9:
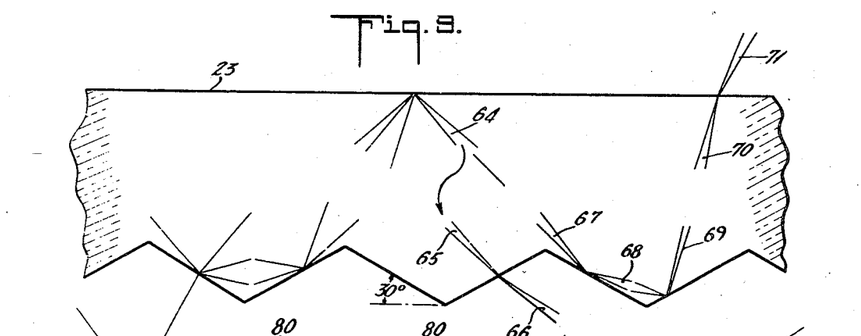

Figure 9 shows what occurs when a 30° prism is employed. Particular attention is called to sector 64 which is composed of light reflected from the upper surface of the plate above the critical angle. Light in this section may turn out to be composed of either rays similar to 51' or 51'' depending on which prismatic surface it strikes. If refractable, it increases the principal cut-off angle as indicated at 65, 66; if a reflectable ray, sector 67, because the slopes of the prisms have been reduced from 32° to 30°, it is reflected from both the surface of incidence and the adjacent surface, subsequently transmitted back into the fixture through the upper surface of the glass, the sectors being indicated at 68, 69, 70, and 71. A 30° prism, therefore, will be classed as a cut-off prism. It will be noted, however, that the upper boundary of sector 68 meets the adjacent surface at the critical angle and that any further increase will result in light leakage at high angles. It will also be noted that the upper boundary of sector 66 is parallel with the adjacent refracting surface. In other words, the principal cut-off in this case equals the total cut-off. Any further reduction in the slope of the prismatic surface would cause a material increase in the principal cut-off angle and transmit considerable light in the glare zone. Any prism with a slope of between 30° and 35° will therefore act as a cut-off prism, presuming the index of refraction of the medium to be about 1.5.

In Figure 10 the normally horizontal incident surface is indicated at 80, and the lower ribbed surface at 81, 81'. The bounding rays 82 and 83 of the internal sector are shown at the angle C to the normal N. The ribbed surfaces are at the angle P' with the horizontal. The limiting rays 82 and 83 fall on the point 84. Here the internally reflected sector 85 by construction has its bisector 86 parallel with the surface 81 of the rib. This sector corresponds with the sector 83—84—87, and the bisector 86 with ray 88. The normal to surface 81 is shown at 89. The value of P' is determined as follows:

Surface 81 makes an angle of 2P' with surface 81', by construction.

Bisector 86, which is parallel to 81, therefore makes an angle of 2P' with surface 81'.

According to the law of reflection, bisector 88 also makes an angle of 2P' with surface 81'.

Angle N-84-89=P' by construction (since line 89 is normal to surface 81')

Angle 83-84-N=C by definition
Angle 87-84-89=C by definition

Therefore angle 83-84-89=C+P'
By subtraction angle 83-84-87=P'
Since line 88 is the bisector of angle 83-84-87 and is separated from surface 81' by 2P' it follows that:

Angle 81'-84-89, which is a right angle by construction $= 2P' - \frac{1}{2}P' + C + P'$ $$5/2 P' + C = 90°$$
$$P' = 2/5(90° - C)$$

With glass or other refracting medium of index of refraction of 1.5 the value of $P'$ (to the nearest °) is 19°. The limiting refractable ray 82 is 42° from N or 23° from 82. An angle of incidence (in such glass) of 23° corresponds with an angle of refraction of 36°. The principal cut-off angle is therefore 19°+36° or 55°. The complete cut-off is at 71°. These cut-off angles are sufficiently below the horizontal to provide satisfactory cut-offs for practical use.

If the foregoing analysis were to be continued herein, it could be shown that the general formula for the angle of cut-off prisms is $$p = \frac{2}{y}(90 - C)$$

where $y$ is an odd integer greater than 1. Where $y$ is 7 the angle is 14°. It could also be shown that in practice a variation above and below the 79° angle of about 1.5° could be tolerated and yet obtain useful results.

Figures 12, 13, 14:
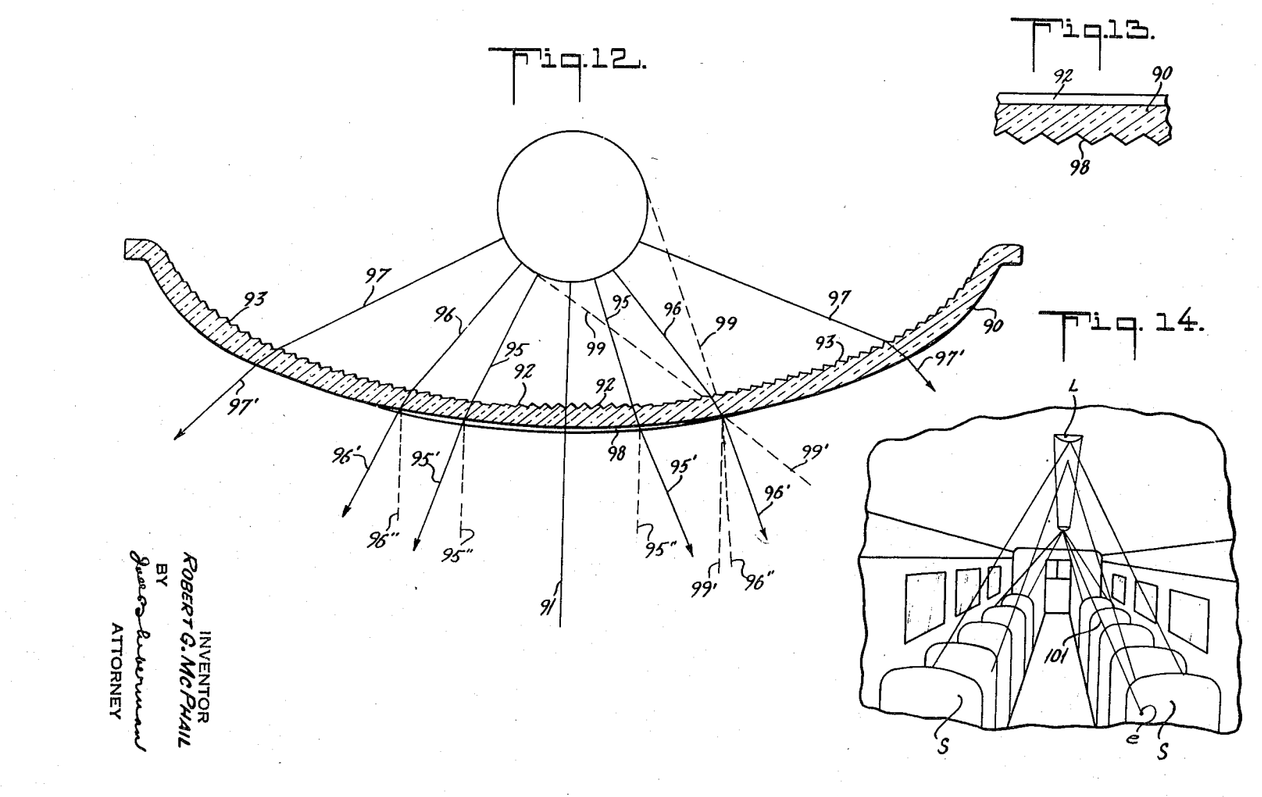
Figures 12 and 13 are transverse and longitudinal cross-sectional views through a car lighting luminaire, using cut-off prisms.
Figure 14 illustrates an installation in the car.

Figures 12, 13 and 14 illustrate the application of the invention to a refractor particularly designed for use over the aisle of a railway car and employing a single line of lamps. The refractor 90 is dished so as to accept nearly all the light below the horizontal. It is symmetrical on opposite sides of the medial vertical plane 91 and has on the upper surface longitudinally extending prisms 92 which spread light away from the nadir and beyond these it has light depressing prisms 93 which lower the light so that two divergent beams of light are generally directed toward the regions occupied by the seats. The paths of the rays in transverse planes are indicated by lines 95—95′, 96—96′ and 97—97′. Not all of the light falling on a point on the upper surface has the angle of incidence indicated in the figure for some of it comes from remote points on the elongated source and is according to the principles of optics, deviated more in the transverse plane. Thus from the lower surfaces of a smooth refractor, light can be emitted at all angles between rays such as 95′ and 96′ and 95″ and 96″, or the nadir, so that there is the hazard of high brightness in the lower surface of the refractor.

In the Figures 11, 12 and 13 the refractor is shown as having transverse ribs 98 occupying a region about 30° each side of the nadir, these ribs having the cut-off angles shown above to be effective for the purpose so that the eyes of the passengers are shielded and receive very little light at angles higher than the principal cut-off angle, not only when directly under the fixture but also, within limits, when lateral of such position.

Owing to the width of the fluorescent source, light rays converge in to points on the upper surface of the refractor as indicated by dotted lines 99—99. This causes a corresponding spread of light in transverse planes, as indicated at 99′—99′, but in longitudinal planes this spreading effect diminishes.

The shielding effect of these cut-off prism plates in a car lighting luminaire L is indicated in Figure 14. The occupants of the seats S obtain the illumination for reading from the portion of the luminaire near them, but when looking at a remote portion of the luminaire, as by the ray 101 from c, obtain only a negligible amount of light. The brightness may well be less than that of the surround.

Figure 15:
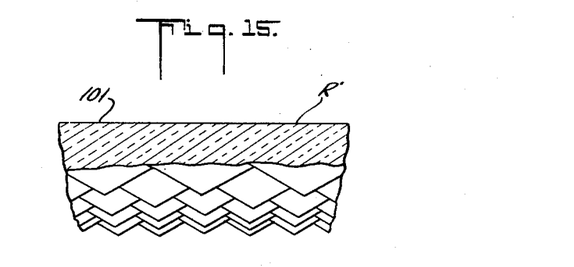
Figure 15 is a perspective view illustrating a plate with cut-off cones.
Figure 16:
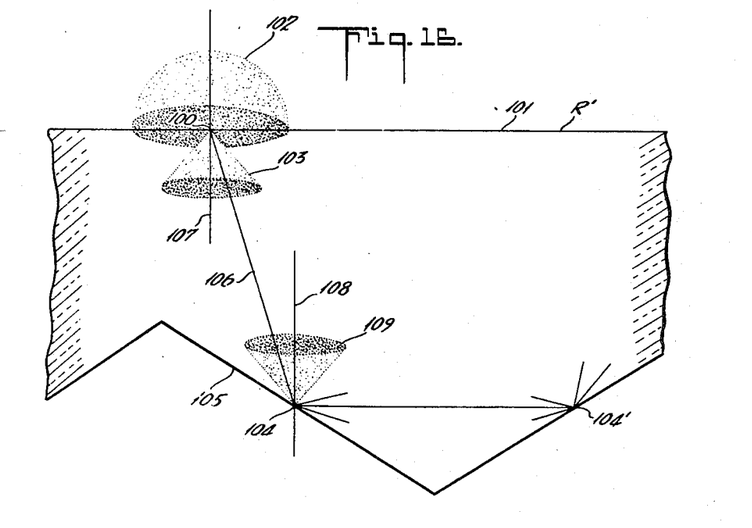
Figure 16 is a sectional view, normal to the incident surface.
Figure 17:
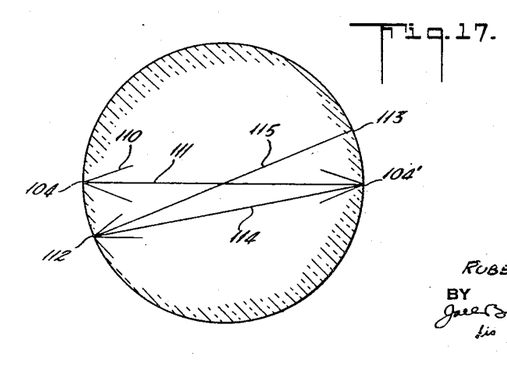
Figure 17 is a horizontal sectional view through a typical cone.

Cut-off cones are a variation of the cut-off prisms, and are illustrated in Figures 15—17. While the prisms consist of parallel ridges with flat sides; the cones are conical projections whose sides have the same slope as the prisms. A perpendicular cross-section of a cut-off prism is identical with a cross-section through the axis of a cut-off cone. Cut-off prisms are designed to control the longitudinal distribution of light from an extended linear source mounted perpendicular to the prismatic ridges. Cut-off cones are designed to control light from a source or sources of any size and shape at any lateral orientation.

Since the cones are multi-directional in effect, in analyzing their operation it is necessary to consider light received from any direction. Fig. 16 shows the cross-section of a 32° cut-off cone plate R′. (For this discussion it will be assumed that the transparent medium is glass with an index of refraction of 1.5.) At a point 100 picked at random anywhere on the upper surface, 101, of the plate, it is assumed that light is received from all directions, as though the plate were illuminated by a hemispherical or an infinite plane source. Such light is represented by hemisphere 102. Upon entering the transparent medium, of which the plate is composed, it is compressed into a cone 103, the angular spread of which will be 84° in all azimuths.

Point 104 represents any point on the surface, 105 of one of the cones. If points 100 and 104 are connected by a straight line, 106, it is obvious that this line makes equal angles with axis 107 of cone 103, which is perpendicular to the upper surface, and a perpendicular 108 to the same surface erected at a point 104. Thus a ray of light traveling along line 106, part of cone of light 103, will form a similar part of a similar but inverted cone of light 109 at point 104. Other such rays might be drawn until the whole cone 109 was built up and in each case they would be found to be similar parts of similar cones of light originating at points on the upper surface. Therefore the principle of reversibility, previously explained in the case of two-dimensional analysis of cut-off prisms, holds true also for a three-dimensional consideration of cut-off cones.

The light in sector 109, upon reaching the outer surface of the glass at point 104, is in part transmitted through the surface into the air and in part reflected back into the glass. If a plane is passed through point 104 and the axis of the cone on whose surface it is located (a plane corresponding to the surface of the paper on which Figure 16 is drawn), the two-dimensional diagram of this cross-section would be the same as the cross-section diagram of a cut-off prism shown in Fig. 5. In this plane, therefore, everything which has been demonstrated in regard to the cut-off prism will apply equally well to the cut-off cone, and it follows that the formula for calculating the slope of cut-off prisms applies to cut-off cones as well.

Many rays of light, however, do not lie in the diametral plane considered above. Further analysis in a plane such as 104—104′ perpendicular to such plane therefore is required. The plane 104—104′ will be parallel with the upper surface of the glass, perpendicular to the axes of the cut-off cones and at right angles to the cross-section just considered.

Figure 17 shows a section through line 104—104′ of Figure 16. It is a circle, and the axis of the cone becomes a point at the center of the circle.

It has been shown that at point 104 a cone of light will be received. It has also been shown that part of this cone of light will be reflected and part of the reflected light will lie in the plane of Figure 17. Segment 110 of reflected light in this plane will be bisected by diameter 111 of the cone.

Since 104 and 104' are any oppositely located pair of points selected at random, it may be assumed that the same condition will hold in the case of any other pair of oppositely located points such as 112 and 113. Light reflected from 104 to 104' will follow the axis of reflection 111. Light traveling from 112 to 104' along line 114, however, does not follow the axis 115, but is separated from it by a certain angle which is equal to the angle between this ray 114 and axis 111. Since this is true of any ray in this plane, the pattern of light received at 104' will be identical with the pattern of light leaving 104. The principle of reversibility is therefore established for reflected light in a plane perpendicular to the axis of a cut-off cone.

The symmetry of reflected rays lying in this plane thus is established and since the slope of the element of the side of the cut-off cone at 104' is equal and opposite to that of the element at 104 the re-reflected light from point 104' will follow a similar, but oppositely sloped path to that of the light received at 104, as shown at the right of Fig. 16. Since the reflected rays leaving 104' meet the upper surface at the same angle as the entering rays received at 104, the rays leaving 104' will be transmitted through the upper surface of the glass back toward the source. For reflected light in any plane parallel to the upper surface of the glass, the cut-off cone, therefore, fulfills its functional requirements.

Thus it can be shown that in mutually perpendicular planes, light reflected from any element of a cut-off cone will be returned through the upper surface of the plate and will not escape below the plate in the form of undesirable secondary emission.

As was the case with cut-off prisms, there is a series of different cones which function as cut-off cones and their slopes can be computed by the same formula used for cut-off prisms. Similar analyses can be made of such cones. It can be shown that cones whose slopes differ materially from the slopes computed according to the formula will emit light at or near horizontal, thus nullifying their value for the intended purpose, but it also can be shown that the same tolerances which were found practical for cut-off prisms may be allowed for cut-off cones.

Instead of having the straight sided, symmetrical prismatic elements on the emergent side of the light transmitter be embodied in transversely extended ridges, as in Figures 5 to 14 inclusive, or in cones as in Figures 15 to 17 inclusive, they may be in pyramids, with light control analogous to that discussed above in detail.

While the foregoing discussion has largely been based on the use of glass with 1.5 index of refraction, it is to be understood that glass, plastics, or other materials of other indexes of refraction may be used. While the configuration of the glass would be obtained by contouring the molds, the plastic could be provided with the cut-off prisms by an embossing or extruding operation or in the molds in which it was formed, or by other methods of fabrication.

What is claimed is:

1. A refractor having in a longitudinally extended plane a first surface and opposed thereto an emergent surface consisting of a series of contiguous, identical, transversely extending symmetrical prismatic elements with straight sides which make with the plane of the first surface, an angle of substantially $$\frac{2}{y}(90°-C)$$

where C is the critical angle of the refracting medium and $y$ is an odd integer greater than unity.

2. A light transmitter composed of a refracting medium having in a longitudinally extended plane a first surface so that light rays in air converging on a point thereon throughout the hemisphere are concentrated on entry into a cone whose axis is normal to the surface and whose apex angle equals twice the critical angle C of the medium and light from any selected longitudinally extending diametrical plane is concentrated to be between limiting rays which have in the normal longitudinal plane, deviation from the normal to the surface equal to the critical angle and variable deviation from both the normal to the surface and the normal longitudinal plane in other planes and within the said critical angle, and light rays in the medium converging on a point on said surface and within the critical angle can pass outwardly through said latter mentioned point, and a second surface, having in said longitudinal diametrical plane refracting areas with straight line intersections with said longitudinal planes to form a hill and valley profile, said intersections making with the rectilinear direction of the first surface, an angle which substantially equals $$\frac{2}{y}(90°-C)$$

where $y$ is an odd integer greater than 1.

3. A light transmitter composed of a refracting medium denser than air and having in a longitudinally extended plane a first surface so that light rays in air in a normal longitudinally extended plane and converged on a point thereon throughout 180° are concentrated on entry into an internal sector-like region whose width equals twice the critical angle C of the medium, and light in the medium converging on a point on said surface at angles not greater than said critical angle, can pass outwardly through said latter mentioned point, and a second surface composed of a series of contiguous, identical, symmetrical prismatic elements with straight sides and wherein the angle each of said sides makes with the plane of the first surface equals substantially $$\frac{2}{y}(90°-C)$$

where $y$ is an odd integer greater than unity.

4. A light transmitter composed of a refracting medium denser than air and having in a longitudinally extended plane a first surface so that light rays in air in a normal longitudinally extended plane and converged on a point thereon throughout 180° are concentrated on entry into an internal sector-like region whose width equals twice the critical angle C of the medium, and light in the medium converging on a point on said surface at angles not greater than said critical angle, can pass outwardly through said latter mentioned point, and a second surface composed of a series of contiguous, identical, symmetrical prismatic elements with straight sides and wherein the angle each of said sides makes with the plane of the first surface equals substantially $60°-2/3C$.

5. A light transmitter composed of a refracting medium denser than air and having in a longitudinally extended plane a first surface so that light rays in air in a normal longitudinally extended plane and converged on a point thereon throughout 180° are concentrated on entry into an internal sector-like region whose width equals twice the critical angle C of the medium, and light in the medium converging on a point on said surface at angles not greater than said critical angle, can pass outwardly through said latter mentioned point, and a second surface composed of a series of contiguous, identical, symmetrical prismatic elements with straight sides and wherein the angle each of said sides makes with the plane of the first surface equals substantially $$36° - \frac{2}{5}C$$

6. A light transmitter composed of a medium of an index of refraction of approximately 1.5 and having in a longitudinally extended plane a first surface so that light rays in air in a normal longitudinally extended plane and converged on a point thereon throughout 180° are concentrated into an internal sector-like region whose width equals 84° and light in the medium converging on a point on said surface and within 42° of the normal, can pass outwardly through said latter mentioned point, and a second surface composed of a series of contiguous, identical, symmetrical prismatic elements with straight sides and wherein the angle said sides makes with the plane of the first surface is between 30° and 35°.

7. A light transmitter composed of a medium of an index of refraction of approximately 1.5 and having in a longitudinally extended plane a first surface so that light rays in air in a normal longitudinally extended plane and converged on a point thereon throughout 180° are concentrated into an internal sector-like region whose width equals 84° and light in the medium converging on a point on said surface and within 42° of the normal, can pass outwardly through said latter mentioned point, and a second surface composed of a series of contiguous, identical, symmetrical prismatic elements with straight sides and wherein the angle said sides makes with the plane of the first surface is between 17.50 and 20°.

8. A light transmitter composed of a refracting medium denser than air and having a light incident surface of indefinite rectilinear extent in a longitudinal plane whereby light at all angles of incidence in said plane is refractively transmitted with angles of refraction within the critical angle of the medium employed and internally transmitted light rays reaching said surface at angles within said critical angle are refractively transmitted to the air and light reaching said surface at angles greater than the critical angle is reflected internally, and an opposite surface onto which the refractively transmitted light falls, said opposite surface being in the form of contiguous, identical symmetrical ridges whereby light falling on each side of each ridge within the critical angle for said ridge surface is refractively transmitted into air and light outside the critical angle for said ridge surface is totally reflected back into the medium, a portion of said latter mentioned backwardly reflected light falling on to the other wall of the ridge for reflection thereby and a portion on to the first light incident surface, the slope of the sides of the ridges being such that the angle said sides makes with the plane of the light incident surface equals $$\frac{2}{y}(90° - C)$$

wherein C is the critical angle of the medium and $y$ is an odd integer greater than 1 and the twice reflected light reaches the incident surface within the critical angle for transmission through said incident surface and the light reflected by only one ridge surface reaches the incident surface outside the critical angle therefor to be reflected thereby toward a remote ridge surface where it has angles of incidence corresponding with that of the light reflected by the first ridge surface onto the second ridge surface and is correspondingly reflected toward the incident surface for transmission similarly into the air.

9. A refractor having light incident and light emitting surfaces and for use with a light source of such extent as to emit rays in a plane intersecting the incident surface of the refractor which converge onto a point where said plane intersects said surface throughout a sector of substantially 180° whereby the refractively produced divergent light rays in the refractor from said point are distributed in a sector of an angular width of 2C, where C is the critical angle of the medium of the refractor, the light emitting surface toward which said rays are in part directed for refractive transmission and in part directed for total reflection, being composed of a succession of refracting surfaces, adjacent surfaces thereof being inclined in opposite directions to the said plane of the incident rays at angles to the normals to the incident surface such that the portion of the sector of rays reflected by one of said light emitting surfaces is directed in part into the adjacent light emitting surfaces for reflection toward the incident surface and directed in part onto the incident surface for reflection thereby, the slopes of the refracting surfaces being such that the angle said surfaces makes with the plane of the light incident surface equals $$\frac{2}{y}(90° - C)$$

wherein C is the critical angle of the medium and $y$ is an odd integer greater than 1 and the bisector of the reflected beam is parallel to one or the other of the succeeding incident surfaces.

10. A transparent light transmitting and refracting plate having one surface generated by the movement of a generatrix remaining parallel with itself and along a straight line, and an opposed surface generated by the movement in a path parallel with the first generatrix, of a generatrix which in a plane through said line is composed of contiguous symmetrical V's, the angle which the sides of the V's make with said straight line being substantially $$\frac{2}{y}(90° - C)$$

where C is the critical angle of the medium and $y$ an odd integer greater than unity.

11. A refractor of generally uniform thickness and longitudinally elongated and made of a medium with an index of refraction of approximately 1.5, the refractor having a light emitting surface composed of a succession of transversely extending, oppositely sloping refracting and reflecting surfaces, making an angle of substantially 32° with the longitudinal plane.

12. A refractor of generally uniform thickness and longitudinally elongated and made of a medium with an index of refraction of approximately 1.5, the refractor having a light emitting surface composed of a succession of transversely extending, oppositely sloping refracting and reflecting surfaces, making an angle of substantially 19° with the longitudinal plane.

13. A lighting fixture comprising a horizontal rectilinear light source, a light transmitter composed of a refracting medium denser than air and having an incident surface parallel with the source and close to it, the light rays from the source in planes lengthwise of the source converging on to points on the incident surface throughout substantially 180° and being concentrated into the internal sector-like regions whose width with respect to such points equals substantially twice the critical angle C of the medium, and a second surface composed of a series of contiguous, identical symmetrical, prismatic elements with straight sides and wherein the angle each of said sides makes with the plane of the said incident surface equals substantially $$\frac{2}{y}(90°-C)$$

where $y$ is an odd integer greater than unity.

14. A lighting fixture comprising a horizontal rectilinear light source, a light transmitter composed of a refracting medium denser than air and having an incident surface parallel with the source and close to it, the light rays from the source in planes lengthwise of the source converging on to points on the incident surface throughout substantially 180° and being concentrated into internal sector-like regions whose width with respect to such points equals substantially twice the critical angle C of the medium, and a second surface composed of a series of contiguous, identical, symmetrical, prismatic elements with straight sides and wherein the angle each of said sides makes with the plane of the said incident surface equals substantially $$60°-\frac{2}{3}C$$

15. A lighting fixture comprising a horizontal rectilinear light source, a light transmitter composed of a refracting medium denser than air and having an incident surface parallel with the source and close to it, the light rays from the source in planes lengthwise of the source converging on to points on the incident surface throughout substantially 180° and being concentrated into internal sector-like regions whose width with respect to such points equals substantially twice the critical angle C of the medium, and a second surface composed of a series of contiguous, identical, symmetrical, prismatic elements with straight sides and wherein the angle each of said sides in the latter mentioned plane makes with the plane of the said incident surface equals substantially $$36°-\frac{2}{5}C$$

16. A lighting fixture comprising a horizontal rectilinear light source, a horizontal light transmitting glass plate with an index of refraction of 1.5 located close to the source receiving light rays from the source in planes lengthwise of the source converging on to points thereon throughout 180° and concentrating them into internal sector-like regions whose width equals 84°, and a second surface composed of a series of contiguous, identical symmetrical prismatic elements with straight sides and wherein the angle each of said sides in the latter mentioned plane makes with the plane of the upper incident surface is between 30° and 35°.

17. A lighting fixture having a rectilinear light source, and a transparent light transmitting plate having a surface adjacent the source generated by the movement of a generatrix remaining parallel with itself and along a line parallel with the source, and an opposed outer surface generated by the movement in a path substantially parallel with the first generatrix, of a generatrix which in a plane through said source is composed of contiguous symmetrical V's, the angle which the sides of the V's make with said straight line being substantially $$\frac{2}{y}(90°-C)$$

where C is the critical angle of the medium and $y$ an odd integer greater than unity.

18. A refractor having in a longitudinally extending plane a first surface and opposed thereto an emergent surface consisting of a series of contiguous, conical, prismatic elements with straight sides which make with the plane of the first surface, an angle of substantially $$\frac{2}{y}(90°-C)$$

where C is the critical angle of the refracting medium and $y$ is an odd integer greater than unity.

19. A refractor having in a longitudinally extending plane a first surface and opposed thereto an emergent surface consisting of a series of contiguous, conical, prismatic elements with straight sides which make with the plane of the first surface, an angle of substantially 60°—2/3C where C is the critical angle of the refracting medium.

20. A light transmitter composed of a medium of an index of refraction of approximately 1.5 and having in a longitudinally extended plane a first surface so that light rays in air in a normal longitudinally extended plane and converged on a point thereon throughout 180° are concentrated into an internal sector-like region whose width equals 84° and light in the medium converging on a point on said surface and within 42° of the normal, can pass outwardly through said latter mentioned point, and a second surface composed of a series of cones with straight sides and wherein the angle said sides makes with the plane of the first surface is between 30° and 35°.

ROBERT G. McPHAIL.

REFERENCES CITED

The following references are of record in the file of this patent:

UNITED STATES PATENTS

| Number | Name | Date |
| --- | --- | --- |
| 2,175,067 | Rolph | Oct. 3, 1939 |
| 2,372,874 | Zimmerman | Apr. 3, 1945 |